(12) United States Patent
McKeon (10) Patent No.: US 7,275,221 B2
(45) Date of Patent: Sep. 25, 2007

(54) METHOD AND SYSTEM FOR REPRESENTING HIERARCHAL STRUCTURES OF A USER-INTERFACE

(75) Inventor: Brendan McKeon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 665 days.

(21) Appl. No.: 10/703,889

(22) Filed: Nov. 7, 2003

(65) Prior Publication Data

US 2005/0102684 A1    May 12, 2005

(51) Int. Cl.
*G06F 3/048* (2006.01)
(52) U.S. Cl. .................... 715/853; 707/101
(58) Field of Classification Search ............ 345/619
See application file for complete search history.

(56) References Cited

U.S. PATENT DOCUMENTS

2003/0063120 A1* 4/2003 Wong et al. ............... 345/746

OTHER PUBLICATIONS

John L. Viescas, Running Microsoft Access for Windows(R) 95, 1996, Microsoft Press, pp. 5, 98, 218, 374, 386.*
Herbert Schildt, The Complete Reference Java(R) 2, 2002, McGraw Hill/Osborne, 5th Edition, pp. 19, 20, 388, 886, 894.*

* cited by examiner

*Primary Examiner*—Weilun Lo
*Assistant Examiner*—John M Heffington
(74) *Attorney, Agent, or Firm*—Shook, Hardy & Bacon, L.L.P.

(57) ABSTRACT

A method, apparatus, and medium are provided for representing multiple programmatic hierarchal structures as a single hierarchal structure. The method includes identifying at least first and second datasets corresponding to first and second hierarchal structures. Referential links are provided between the first and second sets of data so that the first and second hierarchal structures appear as a single hierarchal structure to a software application. An application program interface enables user-interface elements to be manipulated and includes a set of instructions that can receive a request for information related to displaying one or more elements, a set of instructions that identify multiple hierarchal trees capable of satisfying the request, a set of instructions that represent the hierarchal trees as a single hierarchal tree, and a set of instructions that communicates the representation of the single hierarchal tree to a receiving component.

24 Claims, 11 Drawing Sheets

METHOD AND SYSTEM FOR REPRESENTING HIERARCHAL STRUCTURES OF A USER-INTERFACE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of interpreting elements of a user interface in a computing environment and providing information regarding the same.

BACKGROUND OF THE INVENTION

Individuals interact with computers through a user interface. The user interface enables a user to provide input to and receive output from the computer. The output provided can take on many forms and often includes presenting a variety of user-interface elements, sometimes referred to as "controls." Exemplary user-interface elements include toolbars, windows, buttons, scrollbars, icons, selectable options, and the like. Virtually anything that can be clicked on or given the focus falls within the scope of "element" as used herein. Information related to user-interface elements is often requested by assistive-technology products so that the products can enhance a user's computing experience.

Assistive-technology products are specially designed computer programs designed to accommodate an individual's disability or disabilities. These products are developed to work with a computer's operating system and other software. Some people with disabilities desire assistive-technology products to use computers more effectively.

Individuals with visual or hearing impairments may desire accessibility features that can enhance a user interface. For example, individuals with hearing impairments may use voice-recognition products that are adapted to convert speech to sign language. Screen-review utilities make on-screen information available as synthesized speech and pairs the speech with visual representations of words in a format that assists persons with language impairments. For example, words can be highlighted as electronically read. Screen-review utilities convert text that appears on screen into a computer voice.

To provide supportive features to persons that desire to use them, assistive-technology applications do not have access to the same code that native applications are able to use. This is because an assistive-technology application works on behalf of a user; instead of the user working directly with the user interface—as is the case in native applications. For instance, if a word-processing application wishes to display text to user, it can easily do so because the word-processing application knows what program modules to call to display the text as desired. But a screen reader—an application that finds text and audibly recites the text to a user—is unaware of much of a target application's programmatic code. The screen reader must independently gather the data needed to identify text, receive it, and translate it into audio.

Assistive-technology applications work under a variety of constraints. To further illustrate a portion of the constraints that assistive-technology applications are subject to, consider, for example, an application that needs to display the contents of a listbox. This would be an easy task for a native application because it would know where the relevant listbox values are stored and simply retrieve them for display. But an assistive-technology application does not know where the values are stored. It must seek the values itself and be provided with the necessary information to display the values. Thus, assistive-technology applications must function with limited knowledge of an application's user interface.

The difficulties associated with an assistive-technology application performing certain functions on all types of user-interface elements is somewhat akin to the difficulties that would be faced by a person asked to be able to program any type of VCR clock simply by providing access to the VCR clock. Unlike the VCR owner who is familiar with his VCR's clock and has the VCR manual, the fictitious person here has no foreknowledge of what type of VCR he may come across, what type of actions are necessary to program the clock, whether it will be a brand ever seen before, or the means of accessing its settings—which may be different from every other VCR previously encountered. Moreover, expecting the person to know about every type of VCR is an unrealistic proposition. As applicable to the relevant art, it is an unrealistic proposition to expect every client application to know about every type of listbox that it might encounter. Programming such a client application would be an expensive and resource intensive process.

One way a user interface may provide this information is by using logical hierarchal structures. A significant problem in the art, however, is that logical hierarchal structures provided by a user interface often do not have the requisite level of granularity needed by an assistive-technology application. Without the benefit of an adequate description of a UI or knowing the contents of certain data elements (such as listboxes, combo boxes, and many others), assistive-technology applications must request this information from the user interface to be able to manipulate or otherwise make use of the data.

Although assistive-technology applications can provide various user-interface customizations if they can receive accurate data regarding the user-interface elements, providing accurate information regarding user-interface elements has proven difficult. This difficulty stems from the fact that no single entity knows all the relevant information about any particular piece of a user interface. For example, although a list-box component may itself know the individual list-box items contained within it, only the name of the listbox may be known by its parent dialog window. Although a user interface or portion of a user interface may be depicted as a hierarchal structure such as a tree, a single tree may only provide limited information, which can prevent an assistive-technology application from functioning properly.

A shortcoming exists in the current state of the art whereby providing information described by two or more logical trees is either impossible or inordinately difficult. For example, a user interface may have three windows with a button and a listbox in one of the three windows. Information about the user interface may be contained in a first tree while information about the contents of the listbox may be described by a second tree. In such a situation, an assistive-technology application that requires knowledge of both trees must try to derive this information itself, which is difficult. There is no efficient way to represent the two or more trees to the client application as a single hierarchal representation. Accordingly, there is a need for a method and system for providing accurate, comprehensive hierarchal-structure information about user-interface components described in two or more logical trees to a requesting application. Moreover, there is a need to provide the information in a format that is easy for the requesting application to process.

SUMMARY OF THE INVENTION

The present invention solves at least the above problems by providing a system and method that represents two or more logical hierarchal structures as a single hierarchal structure. The present invention aggregates logical trees with referential links, properties, and patterns together as a single tree, even when the trees are structured with disparate technologies. The present invention has several practical applications in the technical arts not limited to providing more comprehensive user-interface information to requesting applications. The information provided is in a format that greatly reduces the resources needed by a client application to modify or use the contents of a user interface. User-interface elements can be modified to enhance the computing experience of persons with disabilities. Exemplary requesting applications are screen readers and visual enhancers. The present invention can also be used by testing applications to facilitate automatic testing such as iterative and regression testing.

In one aspect of the present invention, a method is provided for conveying a representation of multiple hierarchal structures. The method includes identifying a first dataset that corresponds to a first hierarchal structure and identifying a second dataset corresponding to a second hierarchal structure. A first referential link is provided to link the first and second sets of data and to indicate a target hosted node. Finally, a second referential link is provided between the first and second sets of data (the second referential link indicating a source hosting node) so that the first hierarchal structure and the second hierarchal structure appear as a single hierarchal structure to a software application or other receiving component.

In another aspect of the present invention, a data structure for describing a user interface to a client application is provided. The data structure includes a first representation of a user-interface hierarchal structure, a second representation of a second user-interface hierarchal structure, and a relational component that unites the first representation with the second representation. The first representation and the second representation appear as a single hierarchal structure to a requesting component.

In still another aspect, an application program interface (API) is provided that enables one or more elements to be manipulated on a GUI. The API includes a first set of instructions that provides for the reception of a request for information related to displaying the elements, a second set of instructions that identifies one or more hierarchal trees capable of satisfying the request, a third set of instructions that represents the trees as a single hierarchal tree, and a fourth set of instructions that communicates the representation to a receiving component.

In a final exemplary aspect of the present invention, one or more computer-readable media having computer-useable instructions embodied on them are provided for representing multiple programmatic hierarchal structures as a single hierarchal structure. The media include instructions for receiving a request to provide information related to presenting one or more elements on a display device, identifying one or more code portions to provide the information, providing a destination to receive any return values associated with providing the information, and communicating the request and the destination to the identified code portions for providing the information.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides a novel method and apparatus for describing a user interface and/or elements of a user interface in greater detail so that the elements can be manipulated or otherwise used by a client application. The present invention will be better understood from the detailed description provided below and from the accompanying drawings of various embodiments of the invention. The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or network of networks.

Figure 1:
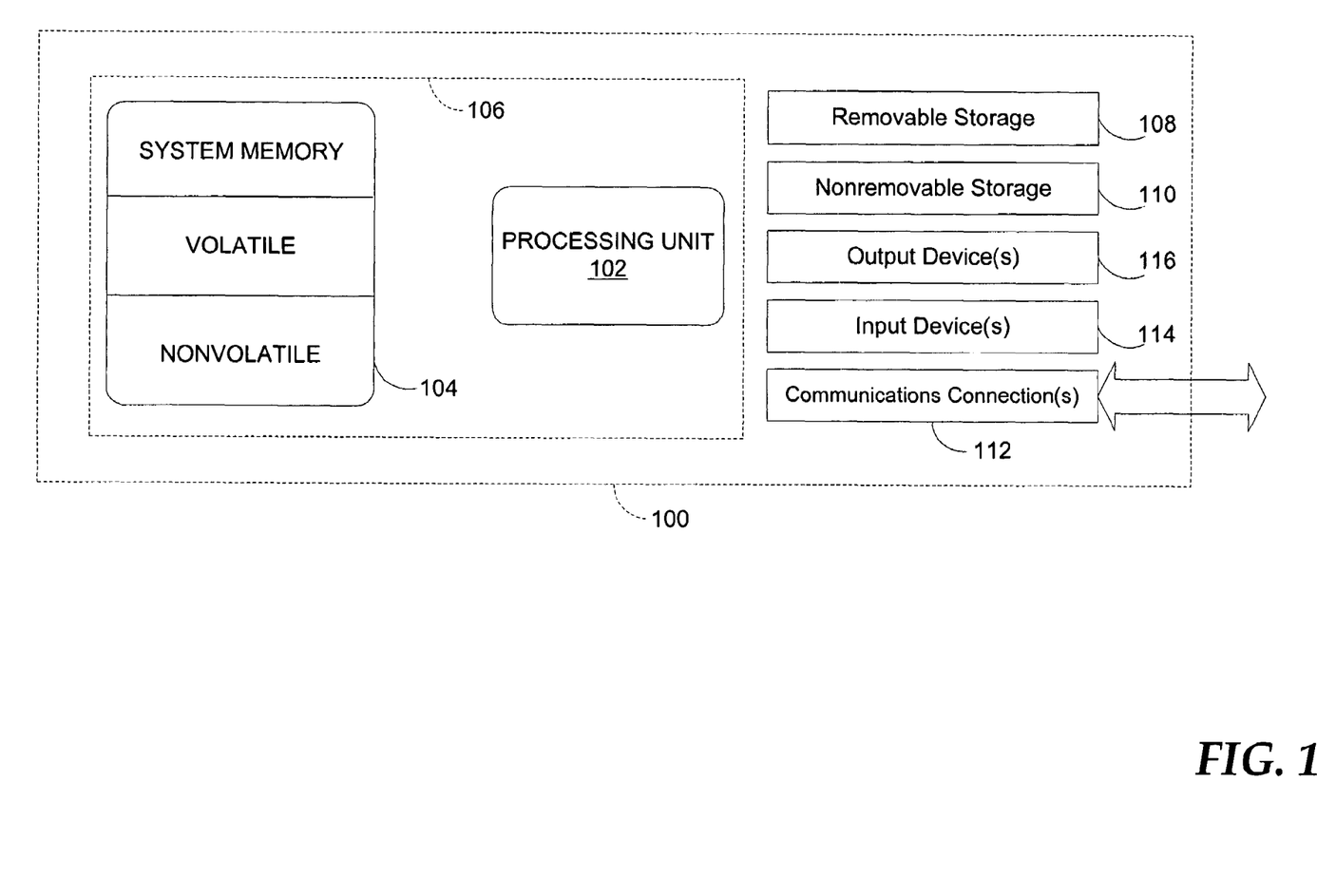
FIG. 1 depicts an exemplary computing environment suitable for practicing an embodiment of the present invention.

With reference to FIG. 1, an exemplary system for implementing the invention includes a computing device, such as computing device 100. Computing device 100 may take the form of a conventional computer, handheld computer, notebook computer, server, workstation, PDA, or other device capable of processing instructions embodied on one or more computer-readable media. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This basic configuration is illustrated in FIG. 1 by dashed line 106.

Device 100 may also have additional features that offer a variety of functional aspects. For example, device 100 may include additional storage (removable and/or non-removable) including, but not limited to, magnetic, optical, or solid-state storage devices. Exemplary magnetic storage devices include hard drives, tape, diskettes, and the like. Exemplary optical-storage devices include writeable CD-ROM, DVD-ROM, or other holographic drives. Exemplary solid-state devices include compact-flash drives, thumb-drives, memory-stick readers and the like. Such additional storage is illustrated in FIG. 1 by removable-storage component 108 and nonremovable storage 110.

Computer storage media include volatile and nonvolatile, removable and non-removable media implemented in any method or technology for storage of information such as computer-readable instructions, data structures, program modules, and the like. Memory 104, removable storage 108 and nonremovable storage 110 are all examples of storage media. Storage media include, but are not limited to, RAM, ROM, EEPROM, flash memory, CD-ROMs, Digital Versatile Discs (DVD), holographic discs, or other optical storage, magnetic cassettes, magnetic tape, magnetic disk storage or other magnetic storage devices, solid-state media such as memory sticks and thumbdrives, or any other medium that can be used to store information and that can accessed by device 100. Any such computer-storage media may be part of device 100.

Device 100 may also contain communications connection(s) 112 that allow the device to communicate with other devices. Communications connection(s) 112 are an example of communication media. Communication media typically embody computer-readable instructions, data structures, program modules, or other data in a modulated data signal such as a carrier wave or other transport mechanism and includes any information-delivery media. The term "modulated data signal" includes a signal that has one or more of its characteristics set or changed in such a manner as to encode information in the signal. By way of example, and not limitation, communication media include wired media such as a wired network or direct-wired connection, and wireless media such as acoustic, RF, infrared, spread spectrum, the many flavors of 802.1 technologies (802.1a, 802.1b, 802.1g), and other wireless media. The term "computer-readable media" as used herein includes both storage media and communications media.

Device 100 may also have input device(s) 114 such as a keyboard, mouse, pen, voice-input device, touch-input device, etc. Output device(s) 116 such as a display, speakers, printer, etc. may also be used in connection with device 100 or incorporated within it. All these devices are well know in the art, need not be discussed at length here, and are not discussed at length so as to not obscure the present invention.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Figure 2:
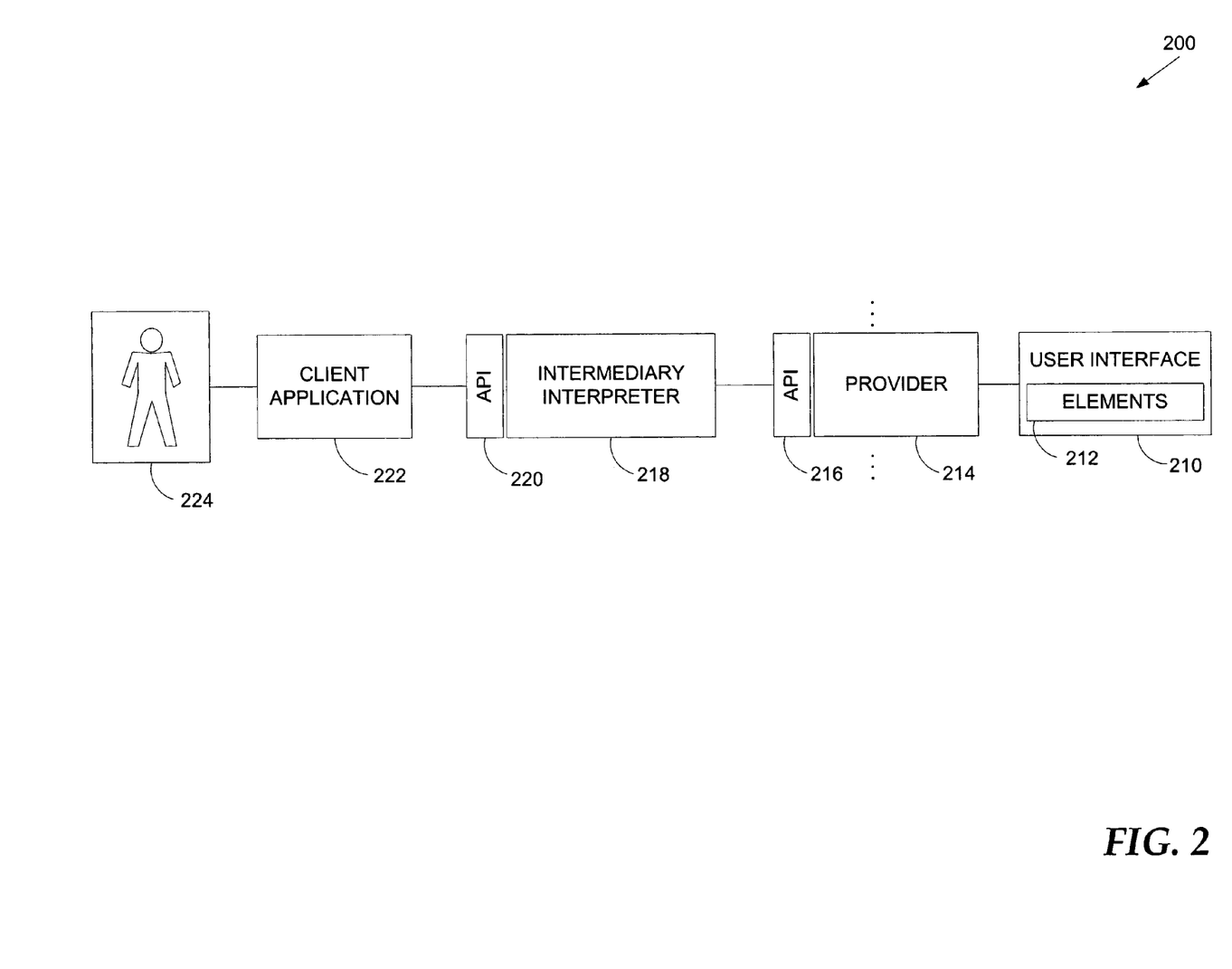
FIG. 2 is block diagram depicting an exemplary data-flow model according to an embodiment of the present invention.

Turning now to FIG. 2, a dataflow diagram in accordance with an embodiment of the present invention is referenced generally by the numeral 200. FIG. 2 includes a user interface 210 that has one or more elements 212. Exemplary items that fall within the scope of elements 212 include any user-interface object that can be clicked on by a pointing device, typed in, given the focus, or activated in a user interface environment. Exemplary elements 212 include a window, a button, a toolbar, a scrollbar, a hyperlink, a text item, an icon, and the like. An element may also include a component that provides auditory or physical feedback, such as an audio-feedback message or a peripheral device that provides physical feedback such as a vibrating mouse.

User interface 210 is coupled to a provider 214, which has associated with it a provider-side API 216. The provider side API 216 is coupled to an intermediary interpreter 218, which has associated with it a client-side API 220 and one or more consolidators (explained in greater detail below). The client-side API 220 is coupled to a client 222, which is finally interacted with by a user 224.

As used herein, a "provider," such as provider 214, is a software component that retrieves hierarchal-component information. The information needed to extract information from various types of controls is packaged within one or more providers. A logical tree is an exemplary way to store hierarchal structural information. Provider 214 may employ a variety of technologies to extract information from a specific element and pass that information on to intermediary interpreter 218. Different elements may have different providers associated with them. Thus, if information about a button is desired, a first provider may be used, whereas a different provider may be used to retrieve information about either a different type of button or a different type of element. In a preferred embodiment, providers work at a control level rather than at an application level. Provider 214 performs several functions not limited to registering itself with intermediary interpreter 218 including providing information related to an element's properties, providing information related to an element's patterns, raising events, and exposing structural elements such as relative links.

"Properties" generally describe a user interface corresponding to a node and patterns generally describe functionality that enable interaction with a node. Different techniques may be employed to gather information from different components. In a first technique, internal APIs may be used to gather desired data. In other applications, a messaging service may be employed or the element's object model, or internal state, may be accessed directly. As reflected by the ellipses shown in FIG. 2, operating environment 200 may include any number of providers 214 and corresponding provider APIs 216.

Intermediary interpreter 218 receives information provided by one or more providers 214 and presents that data in such a way that client application 222 sees one seamless hierarchal structure. A "tree" refers to a logical data arrangement where the data arrangement assumes a hierarchal nature. The functionality provided by intermediary interpreter 218 will be explained in greater detail with reference to FIGS. 3 through 9.

Figure 3:
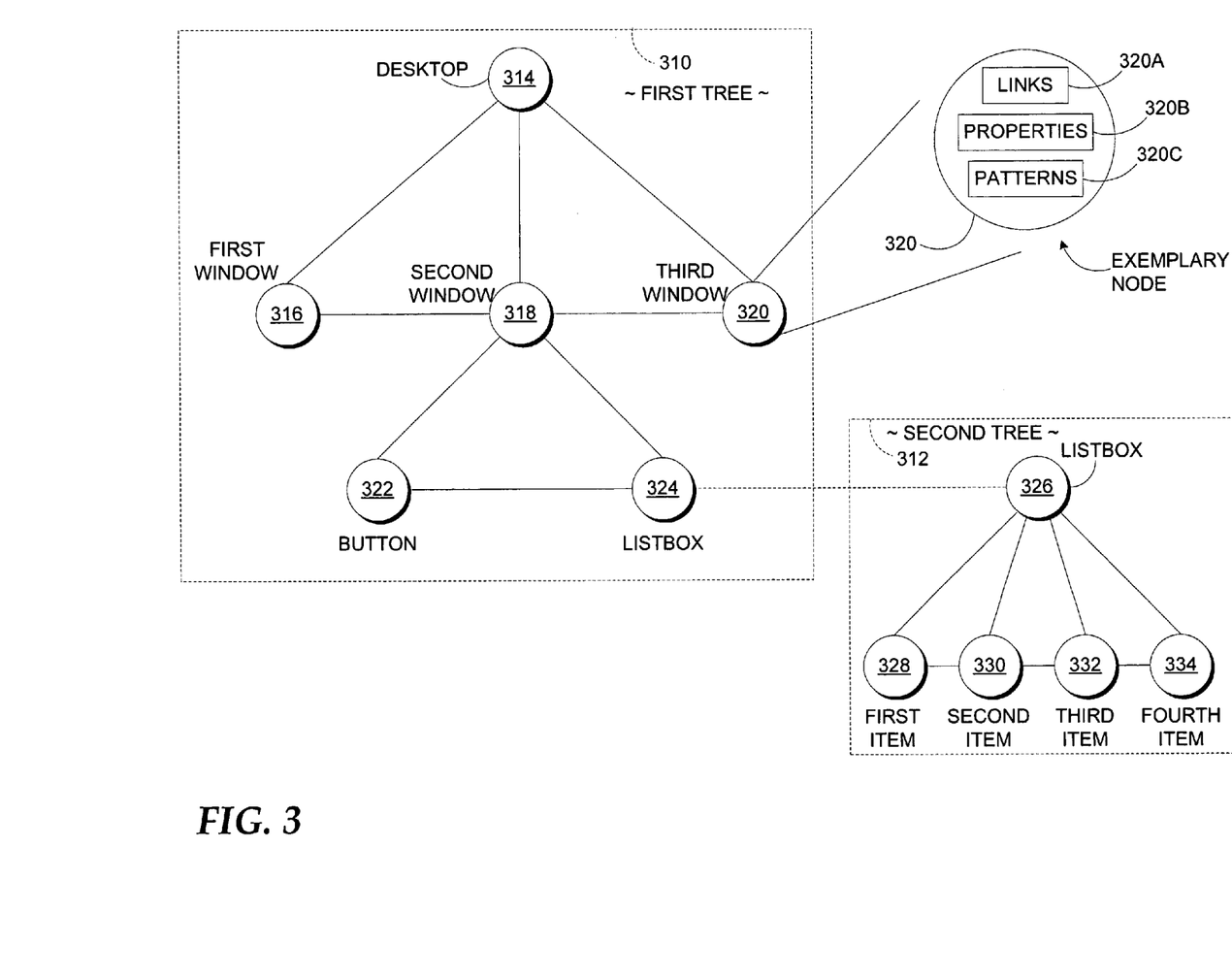
FIG. 3 depicts an illustrative node having links, properties, and patterns and illustrates a user-interface portion that requires two hierarchal structures to describe it.

Turning now to FIG. 3, a first tree 310 is depicted along with a second tree 312. As with all trees described and illustrated herein, trees 310 and 312 are illustrative in nature and should not be construed as a limitation of the present invention. In practical application, trees are often significantly more complicated and may have several tens or hundreds of nodes spanning several layers. The foregoing tree illustrations are provided in a simplified format so as to not obscure the present invention. Tree 310 provides an illustration of how a desktop that has certain elements may be represented as a logical tree.

As shown, the desktop includes three windows where the second window has a button and a listbox. Thus, the desktop itself is represented by node 314. The three windows that appear on the desktop are represented by child nodes 316, 318, and 320, which respectively correspond to a first window, a second window, and a third window. The second window, represented by node 318, includes a button and a listbox, which are represented by respective nodes 322 and 324.

Programming resources and operating efficiencies limit the amount of information contained in any single tree. Thus, a variety of logical trees are used to represent various levels of granularity in a user interface. FIG. 3 illustrates that the granularity of desktop tree 310 stops with a label of listbox 324. If a requesting application desired information relating to the desktop (e.g., the contents of listbox 324) then that request, in certain situations, may not be able to be fulfilled because desktop tree 310 does not include information relating to the elements within listbox 324. That level of granularity is provided in the listbox tree 312. Typically, separate APIs are used to access each tree.

As shown, listbox 312 includes a listbox that has four items. The listbox is represented by node 326 and each of its four corresponding list-box elements is represented by child nodes 328, 330, 332, and 334. The present invention provides a method for merging logical trees, and in this example, would provide to a requesting component a representation that would appear to be a single tree including granularity encompassing the desktop representation all the way down to the list-box elements.

With further reference to FIG. 3, node 320 is arbitrarily selected as an exemplary node used throughout the description of the present invention. Shown in blowup form, exemplary node 320 includes a set of relative links 320A, a set of properties 320B, and a set of patterns 320C. Relative links 320A refer to a description of the relative links associated with a specific node, which relative links will be described in greater detail with reference to FIG. 6. Properties 320B describe element attributes. Exemplary element attributes include an indication of an element's position, an element's name, a description of an element's type (e.g., whether the element is a button, a window, a listbox, a combo box, etc.), whether the element is read-only, whether the element can receive the focus, whether the element is enabled or disabled, and the like. Although other terms may be used in the art, properties 320B are intended to include the litany of other attributes in addition to the exemplary attributes provided.

Patterns 320C enable client application 222 to access the broad functionality associated with a control or user-interface element. As would be appreciated by one skilled in the art, patterns 320C can be interfaces where different patterns represent different types of functionality. In this way, interfaces are used in programming languages to access functionality of elements. For example, buttons and similar controls that can be pressed to issue commands support a pattern that allows a client to press the button or otherwise issue an associated command. Listboxes, comboboxes and other controls that manage selection of child items support a pattern that allows a client application to request changes to the selection. Controls that have multiple aspects of functionality can support multiple patterns simultaneously. Patterns 320C are an example of the attributes/information associated with a node, and should not be construed as limitation of the present invention. Where such information exists, however, the present invention provides for its merging, as will be described in greater detail below.

Figure 4:
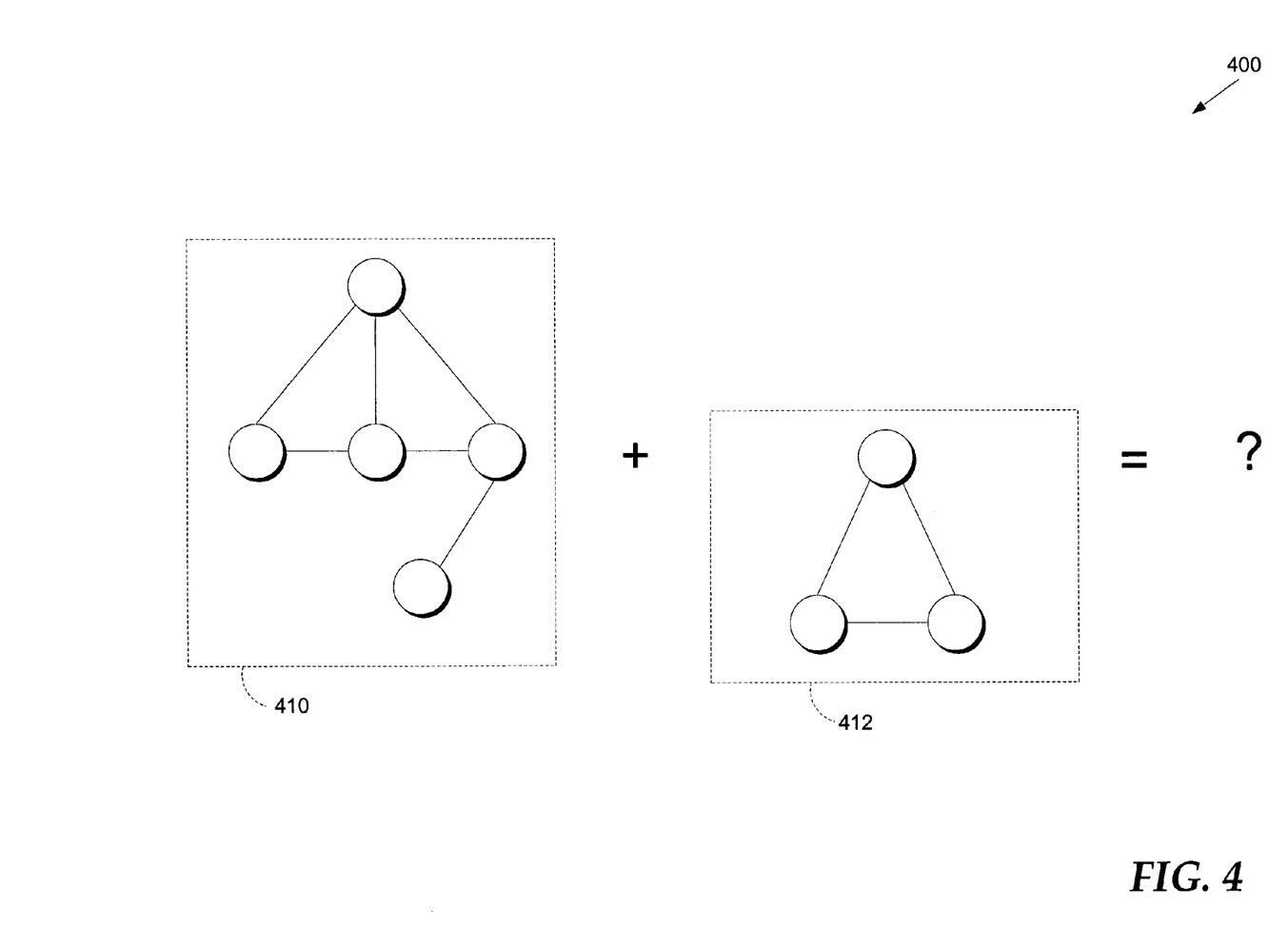
FIG. 4 visually depicts a problem to be solved by the present invention, namely how to merge two hierarchal structures.

FIG. 4 visually depicts one of the problems to be solved by the present invention. That is, FIG. 4 illustrates that two hierarchal structures, trees 410 and 412, are to be logically merged.

Figure 5:
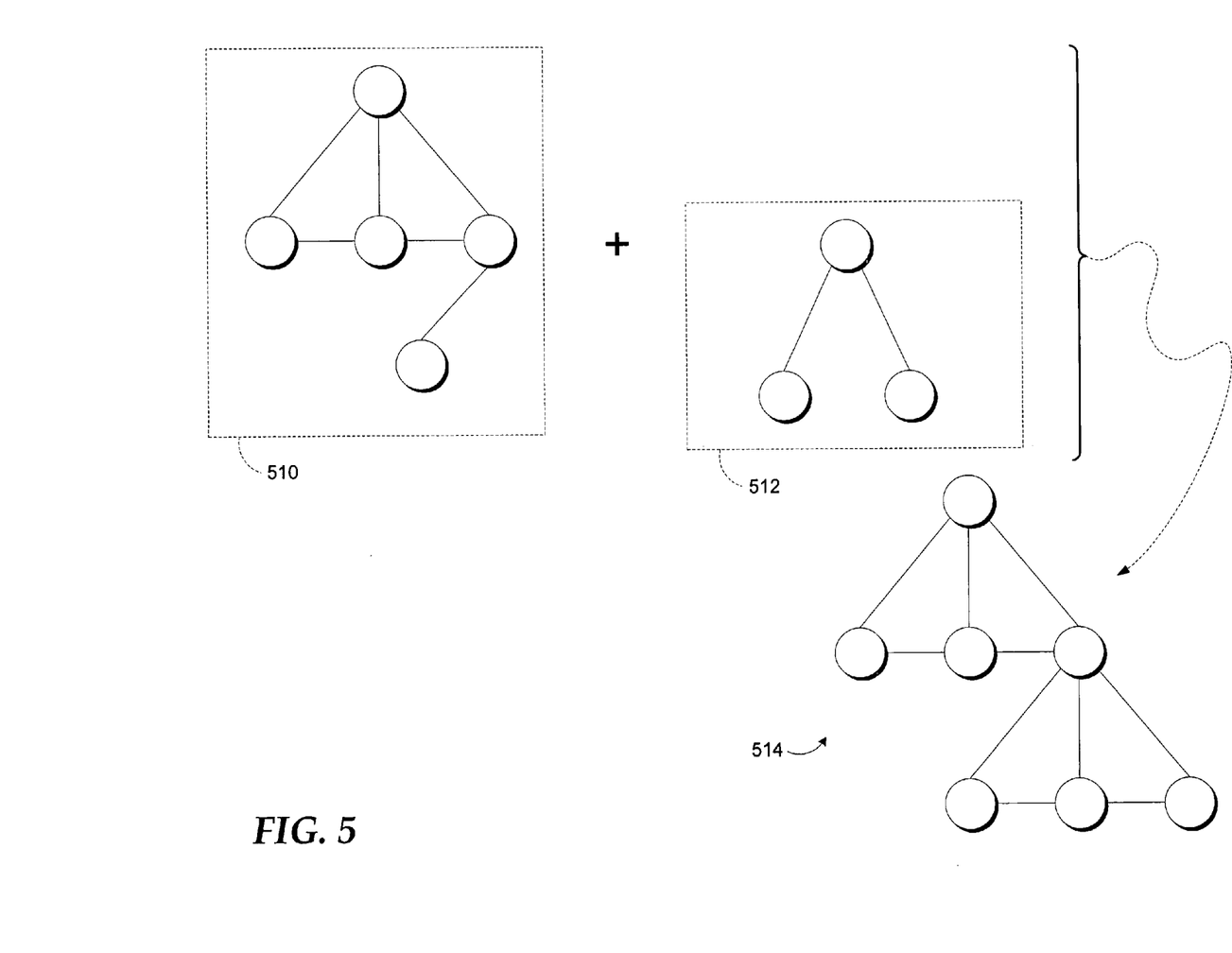
FIG. 5 is a block diagram depicting an object of the present invention, to represent two or more logical trees as a single tree.

FIG. 5 illustrates combining a first logical tree 510 with a second logical tree 512 to produce what appears to client application 222 as a single tree 514. Tree 514 is depicted as a representation of how client application 222 views the combination of trees 510 with 512 and is not intended to convey that tree 512 is actually grafted onto tree 510. Rather, as will be discussed in greater detail below, an object of the present invention is for client application 222 to be presented with a representation that appears to be a single logical tree, but which in fact is an aggregation of multiple trees that includes referential identifiers to create the appearance of a single tree. Moreover and in addition to aggregating the relative links is trees 510 and 512, the set of properties and patterns associated with the merged node will include the aggregated properties of the corresponding nodes from trees 510 and 512. But combining tree 512 with tree 510 is a nontrivial task. Each node of FIG. 5 can potentially refer to five different nodes as depicted in FIG. 6.

Figure 6:
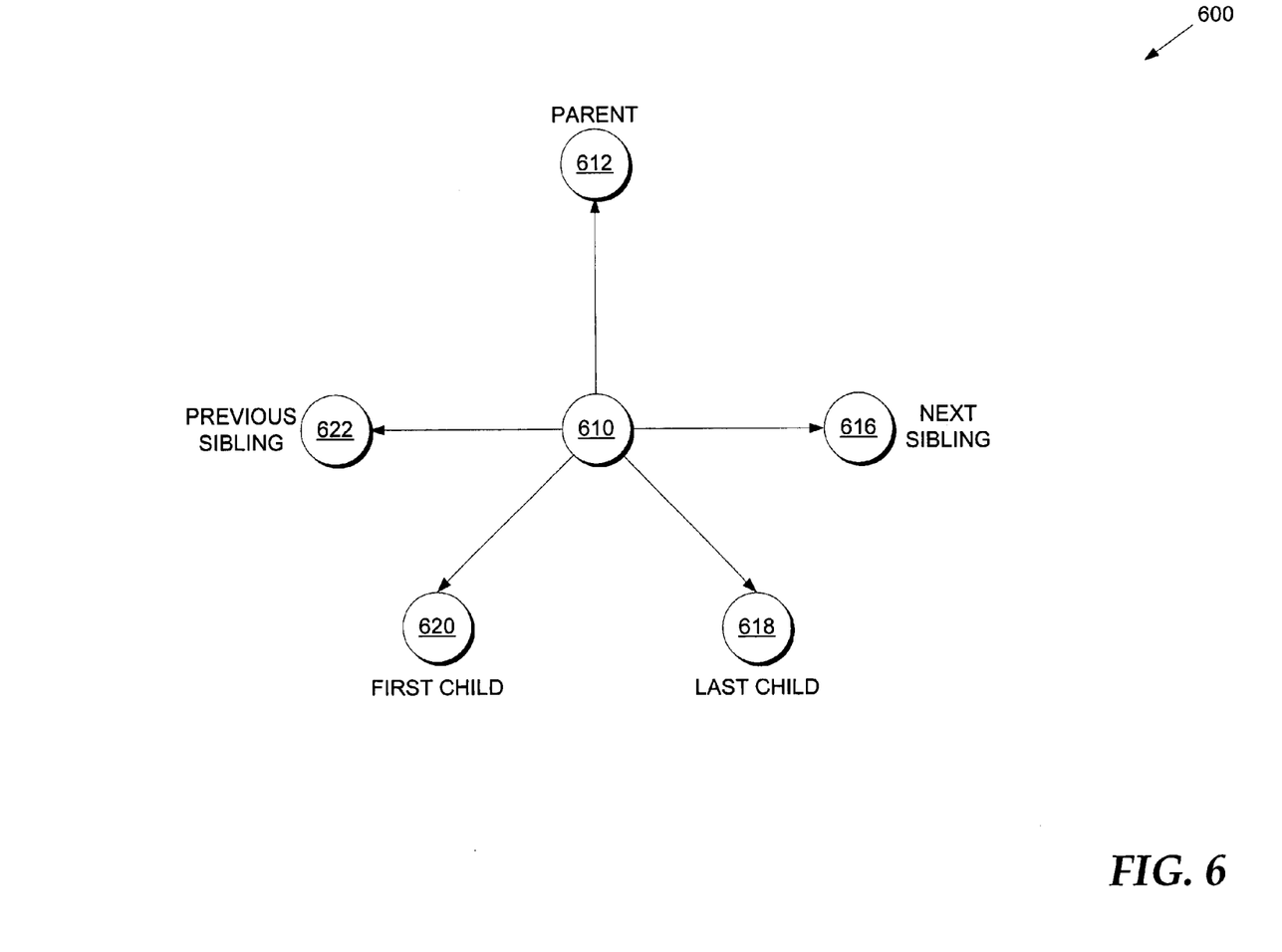
FIG. 6 is a block diagram depicting the various node relationships available to a node in accordance with an embodiment of the present invention.

FIG. 6 illustrates an exemplary set of hierarchal links associated with a node. A central node 610 may have at least one parent node 612, a next-sibling node 616, a last child node 618, a first-child node 620, and a previous-sibling node 622. FIG. 6 illustrates that a single node may refer to at least five different nodes. Although not shown, each of the five different nodes may also refer to other nodes. That is, FIG. 6 does not illustrate potential bidirectional relationships associated with each node.

Figure 7A:
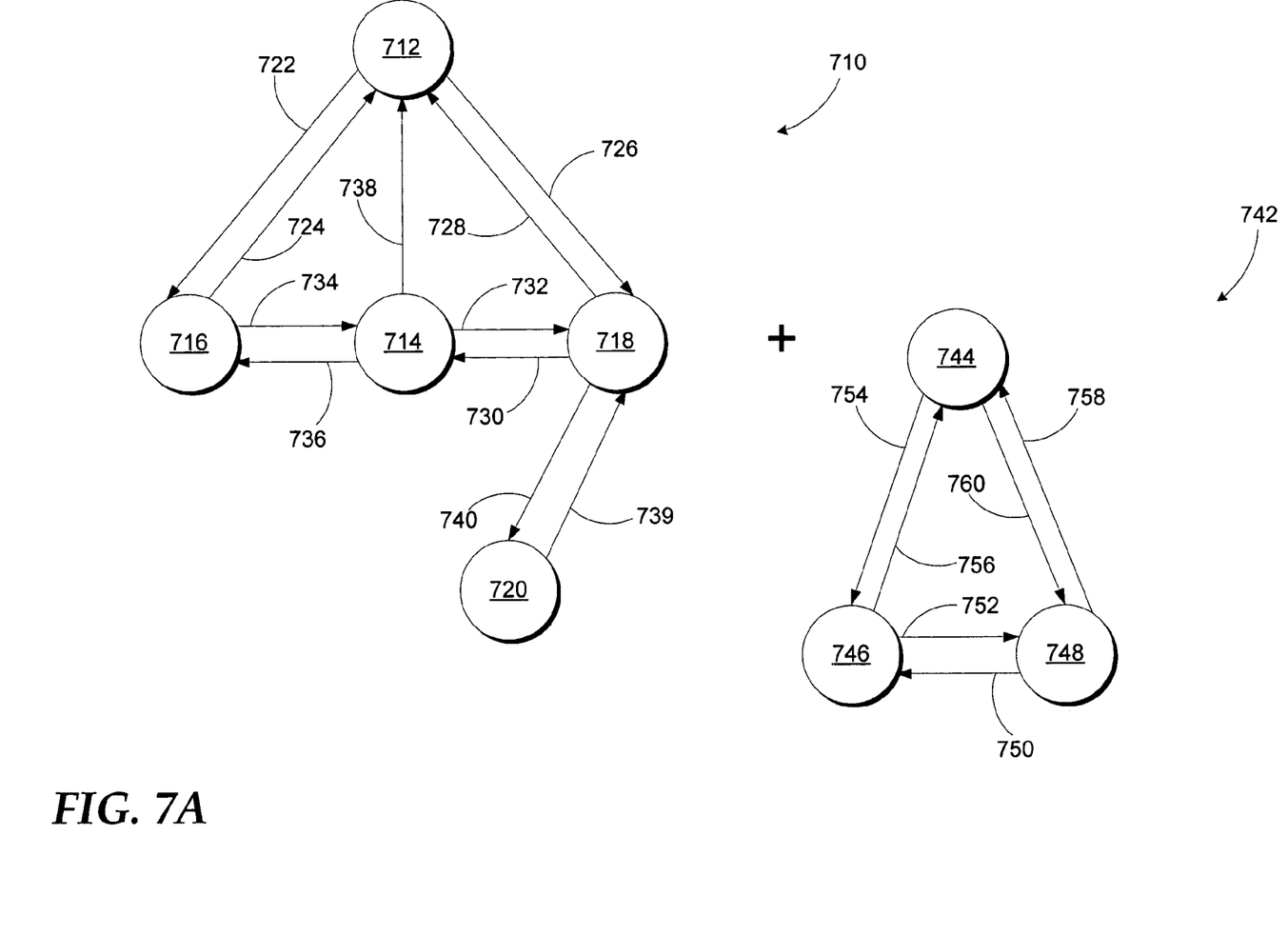
FIG. 7A is a more detailed diagram illustrating bidirectional data-flow requirements in accordance with an embodiment of the present invention.

FIG. 7A is a diagram that illustrates in greater detail relationships between the nodes of two trees to be combined. A first tree 710 is shown that has a top node 712 and a child node 714, which has a previous-sibling node 716 and a next-sibling node 718. Node 718 has a child node 720. Nodes 716 and 718 are also first-child and last-child nodes of parent node 712. Links are depicted between the various nodes of tree 710 that enable navigation between the nodes (tree traversal). Links 722 and 724 relate data between nodes 712 and 716. Links 726 and 728 establish a parent-child relationship between nodes 712 and 718.

Relative links 730 and 732 establish a previous- and next-sibling relationship between nodes 714 and 718. Links 734 and 736 provide a previous- and next-sibling relationship between nodes 716 and 714. Node 714 is denoted as the child node 712 by link 738. Links 739 and 740 provide a parent-child relationship between nodes 718 and 720. Second tree 742 is composed of three nodes—parent node 744, first-child node 746, and last-child node 748. A sibling relationship is established between nodes 746 and 748 by links 750 and 752. Relative links 754 and 756 establish a first-child relationship between nodes 744 and 746. Links 758 and 760 establish a last-child relationship between nodes 744 and 748.

One method for representing tree 712 and tree 742 as a single tree would be to actually graft tree 742 on to tree 710 and then update all the links and notations associated with the affected node(s).

Figure 7B:
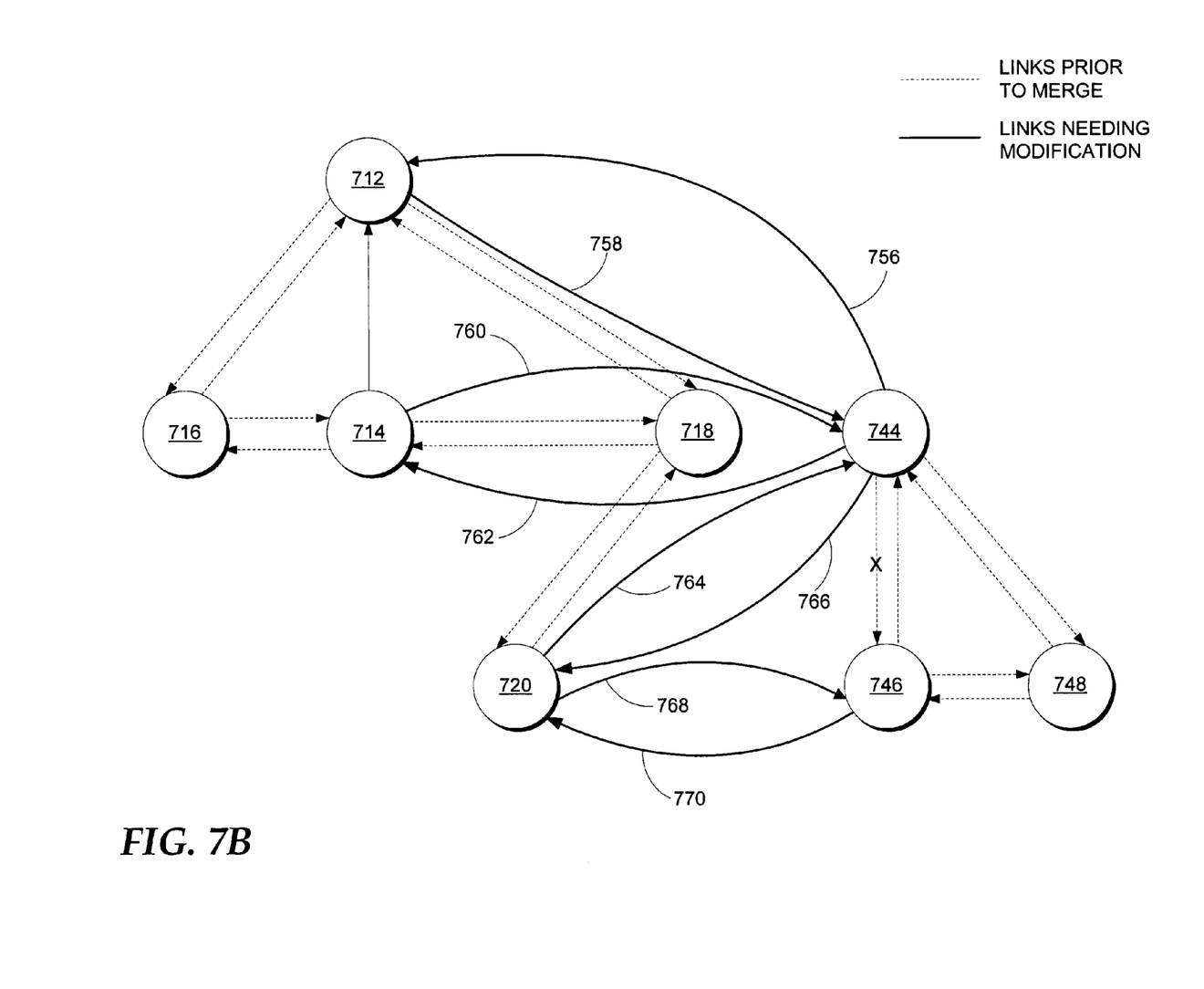
FIG. 7B is a block diagram that illustrates a portion of the problems and disadvantages associated with directly grafting a first tree onto a second tree.

FIG. 7B illustrates a portion of the complexities involved in actually grafting tree 742 on to tree 710. FIG. 7B does not illustrate all of the complexities associated with grafting tree 742 onto tree 710. Rather, FIG. 7B illustrates merely a portion of the complexities that would need to be contemplated and resolved by a developer in connection with grafting tree 742 onto tree 710. In FIG. 7B, the links in a state prior to a tree merge are reflected by dashed lines. The links requiring modification are shown in a heavier line width.

If tree 742 were grafted onto tree 710, then links 756 and 758 would need to be established between nodes 712 and 744 to establish a proper parent/child relationship. A determination would also need to be made as to whether nodes 718 or 744 would be designated as a last child. Links 760 and 762 would need to be established and reconciled so as to establish a sibling relationship between nodes 714 and 744. Node 720, which previously was a lone child node of 718, would need to be updated as a first-child node and as a new previous-sibling node, associated with node 746. Links 764 and 766 would need to be added and reconciled to establish the parent/child relationship between nodes 744 and 720. Links 768 and 770 would need to be established between nodes 720 and 746 to establish a sibling relationship. Node 746, which used to be a first child, would need to be updated to a next and previous sibling.

As previously mentioned, other issues associated with grafting tree 742 onto tree 710 need to be reconciled, but FIG. 7B illustrates a portion of the complexities associated with actually merging two even relatively simple trees. If trees 710 and 742 were more complex than having merely five nodes and three nodes respectively, then even more links, properties, patterns, and notations would need to be updated in connection with merging the two or more trees.

In a method where tree 742 is actually grafted onto tree 710, the task of updating the various links and corresponding properties would fall to the providers 214. If the providers 214 do not accurately update all of the applicable links 320A, properties 320B, and patterns 320C, then client application 222 will not be able to navigate through the resulting tree. For instance, consider nodes 720 and 746 of FIG. 7B. If node 720 is not updated to be the first child of node 744, then client application 222 may receive bad information that node 746 is the first child of node 744, when it is not. To the extent an application relied on a correct designation of the first child of node 744, that application would produce erroneous results.

In another example, consider links 768 and 770 between nodes 720 and 746 in FIG. 7B. If nodes 768 and 770 are not correctly established, then client application 222 may hit a logical wall and be prevented from navigating out of the resulting tree. If an application, such as client application 222, cannot navigate out of a logical tree structure, then the application may hang, thereby preventing control from being returned to user 224.

The complexity associated with coding one or more providers 214 capable of updating all of the relevant links 320A, properties 320B and patterns 320C is virtually overwhelming. Such a task would be exacerbated by the fact that different trees have different ways of storing links. That is, a first tree may designate relative links 320A in a first manner but a second tree may designate relevant links 320A in a second manner. Actually merging the two trees would be difficult because of the disparate methods employed for storing links 320A. According to a preferred embodiment, the present invention provides a set of referential links between a hosted and a hosting node as illustrated in FIG. 7C.

Figure 7C:
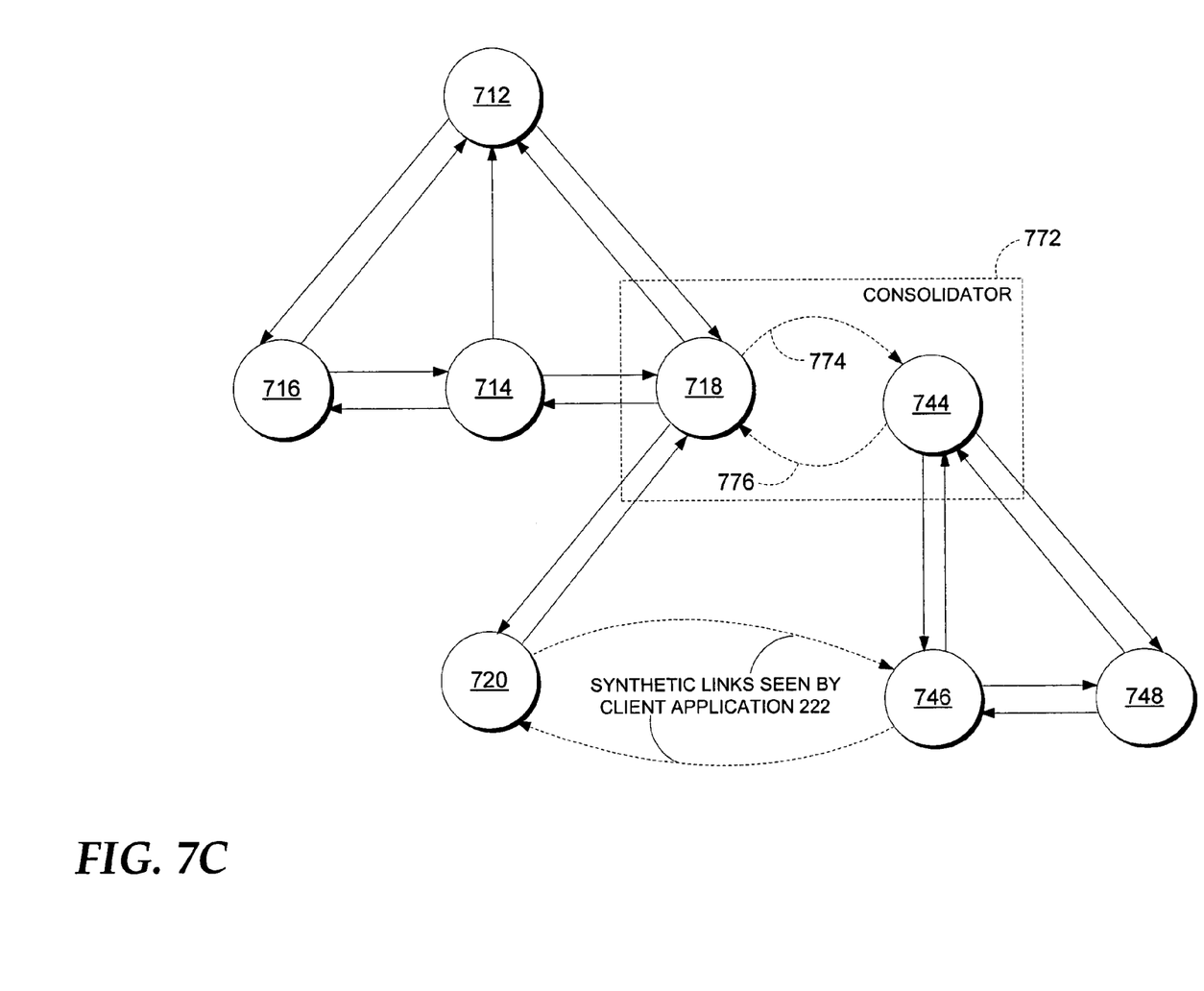
FIG. 7C is a block diagram illustrating a merging of two trees in accordance with an embodiment of the present invention.
Figure 8:
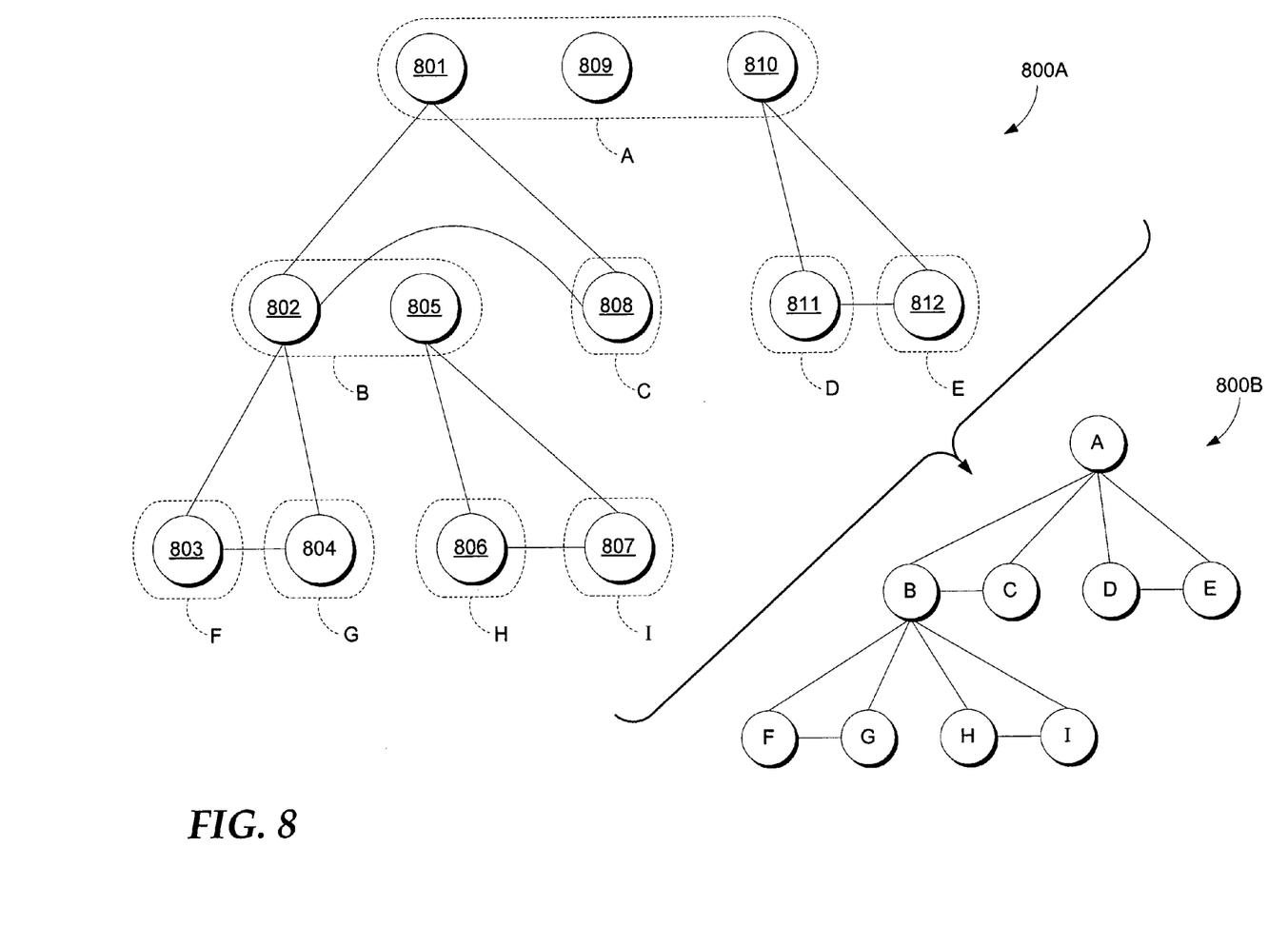
FIG. 8 is a block diagram illustrating how consolidators are used to traverse a merged tree in accordance with an embodiment of the present invention.

As shown, FIG. 7C illustrates that intermediary interpreter 218 merges the patterns, properties, and links of nodes 718 and 744. This merging is referenced generally by consolidator 772. As previously mentioned, intermediary interpreter 218 includes one or more consolidators. A consolidator is a representation of a single node (as illustrated in FIG. 8) or a logical merge of two or more nodes. Consolidators embrace technical schemes where a user interface, such as user interface 210, is composed of heterogeneous trees of elements 210 and enables a client to view these heterogeneous trees as a single tree.

As described above, information for a particular piece of user interface 210 often comes from multiple sources. For example, in the case of a button on a screen, the location, visual state, enabled/focused information, etc., may come from an underlying user-interface framework. The fact that the element is a button and can be pressed is information derived from the control itself. Still further, another software application may have information about the purpose of this button within the context of the overall application. Intermediary interpreter 218 remedies the information disparities by logically merging properties and patterns together using a method that employs a multiple-provider architecture.

In this manner, a first referential link 774 indicates that node 744 is being hosted by node 718. A second referential link 776 indicates that node 718 is being hosted by node 744. Incident to receiving a request from client application 222, intermediary interpreter 218 identifies one or more trees that are to be represented as a single tree. Intermediary interpreter 218 then provides first and second referential links 774 and 776. Consolidator 772 then acts as a merging agent between the two trees. For example, when node 712 attempts to communicate with its last child node, intermediary interpreter 218 provides feedback to the relevant nodes that the nodes are communicating with a set of merged nodes. Thus, client application 222 would perceive communications pathways between nodes 718 and 748 of FIG. 7C because consolidator 772 makes nodes 718 and 744 appear to be a single entity rather than as two nodes. Consolidator 772 uses referential links 774 and 776 as a source of information to represent nodes 718 and 744 as a single node. Accordingly, a data structure is provided to client application 222 composed of a first representation of tree 742 and a second representation of tree 710 to make the two representations appear as a single hierarchal structure to client application 222.

A benefit of this approach is that it simplifies the task of providing information to a requesting component, such as client application 222. Each provider need only expose the information it is aware of, allowing other providers to provide other information. No longer do the providers 214 need to facilitate subclassing or wrapping existing providers to navigate the hierarchal representation. The respective consolidators obtain links 320A, properties 320B and patterns 320C of nodes 718 and 744 such that a client sees only a single node with all the properties, patterns and children from all of the providers 214.

In a preferred embodiment, providers are arranged in order from lowest to highest—the lowest corresponding to the host user-interface component, the highest corresponding to the hosted user-interface component. The terms "lowest" and "highest" as used herein are not limitations but are used to define end points. Conceptually, however, higher providers can be thought of as being stacked on lower ones, with the higher ones taking precedence.

Additional providers can be employed in connection with some embodiments of the present invention to allow software applications or elements to add additional providers. Including these additional providers is optional and should not be construed as a limitation of the present invention. A first exemplary function offered by an illustrative additional provider is to add more information from an application and can be used where an application has additional knowledge that it wishes to expose to intermediary interpreter 218. These providers can be referred to as "override providers" and are logically denoted with the highest precedence. Other providers can add default information for certain user-interface types. For example, most windows of a user interface are capable of containing scrollbars. A "default" provider can be added to provide these scrollbar-related properties so that other providers do not have to. Client application 222 sees the aggregated result. These providers preferably take on a lower precedence order. Also, "repositioning providers" allow some elements to add providers specifically to influence the shape of a tree.

In a preferred embodiment, intermediary interpreter 218 constructs sets of providers for a particular user-interface element and treats all providers the same irrespective of what their purpose is, where they come from, or how many providers are present.

To determine an information set such as properties 320B or patterns 320C, intermediary interpreter 218 queries each provider to determine the set that it supports. It then combines the results with the results from the other relevant providers. Duplicate entries are removed. The result is that client application 222 sees the union of properties from all providers.

To determine a specific property or pattern, intermediary interpreter 218 queries each provider, from the highest to the lowest, for the requested data (such as a property like "Name," or a pattern like "InvokePattern," which is an object that represents the ability to push a button, for example). When intermediary interpreter 218 receives an affirmative response from a first provider in sequence, it returns those results to client application 222 without asking the providers in a preferred embodiment.

Traversing a Tree

Similar to the method for aggregating properties 320B, intermediary interpreter 218 locates parent nodes from the highest to the lowest in a preferred embodiment.

Intermediary interpreter 218 combines child nodes by exposing the children of the lowest providers prior to those of the highest in a preferred embodiment. In alternative embodiments, the order can be reversed as long as the order chosen is employed consistently. When the identification of a first child is requested, intermediary interpreter 218 iterates over the providers from lowest to highest until it identifies one that has a first child, and then uses that. Identifying a last child is similar, except that intermediary interpreter 218 iterates over the providers in the reverse direction—from highest to lowest.

Identifying siblings is somewhat more complicated and will first be described generally and then illustratively with reference to FIG. 8. If intermediary interpreter 218 were to simply look for the first node that had a response for the next or previous link as it does with a parent and first/last child, inconsistencies may develop in the resulting tree. To identify child nodes, intermediary interpreter 218 first determines which node can identify the respective parent. Intermediary interpreter 218 then queries that node for the next or previous sibling, ensuring a consistent tree. If that node replies with a positive response, then the returned node is communicated back to the client.

If the node replies that it does not have a sibling, then processing is not completed. The identification mark could simply be at the end of one provider's collection of children. The parent node may have other providers that are providing other children that should be treated as siblings. Accordingly, intermediary interpreter 218 navigates to the parent and then determines which of the providers in that parent sourced the navigation. Traversal advances in the appropriate direction of the parent's provider list (lowest to highest if looking for next sibling) until the next provider that has children is identified. Once identified, that parent's first child is identified as a next sibling. Similarly, its last child can be identified as a previous sibling if a previous sibling was being sought.

To further explain the methods described above, an example is provided here with reference to FIG. 8. FIG. 8 depicts two trees, 800A and 800B. In FIG. 8, the nodes correspond to providers. Twelve providers are shown as nodes 801-812. Tree 800A is composed of three providers, 801, 809, and 810, logically merged by a consolidator A. Two providers, 802 and 805, are logically merged by consolidator B and appear as a first child of consolidator A. Providers 804, 806-808, and 811-812 are arranged as shown with corresponding consolidators to describe methods consistent with this illustrative embodiment. Each consolidator contains references to one or more providers and can extract information from the providers for a particular user-interface element. Given one provider in a set, the respective consolidator can determine the others by following the referential links (such as links 774 and 776 of FIG. 7C). Tree 800B represents how client application 222 sees tree 800A according to the method and data structures of the present invention.

Two main consolidators are depicted in FIG. 8, consolidator A (which logically merges data from three providers) and consolidator B (which logically merges data from two providers). Assume client application is at consolidator B within tree 800A and the "next child" is to be identified. First, the provider is identified that knows who the parent is. In this case, provider 802 knows who the parent is. Thus, provider 802 is then queried for its next sibling, responding with "808." From this information, consolidator C is constructed and node 808 is identified.

Now assume that the next child is again to be identified. First, the present invention determines which provider knows the parent. The provider that knows the parent is provider 808. Provider 808 is then queried for its next sibling. This time it cannot identify a next sibling. Accordingly, navigation is made up the tree to parent provider 801. Consolidator A is used to determine which provider (801, 809, or 810) was the applicable parent. In this case, that parent is provider 801. Next, children are attempted to be identified. Provider 809 is queried but passed over because it has no first child. Provider 810 is queried and indicates that it does have children. Further, provider 811 is identified as a first child and consolidator D is constructed. In doing so, traversal has been made from B to C to D. From the perspective of client application 222, tree 800A appears as though there was a link between C and D even though those providers may not be aware of one another. This apparent relationship is illustrated in tree 800B. The process described above allows for generic tree traversal, regardless of the starting node.

Certain types of traversal allow the process to be simplified. For example, to identify all the children of node A, the present invention can simply query each of its providers for their children and union the resulting set together. With continuing reference to FIG. 8, consider consolidator A. Node 801 would return {802, 808}, from which consolidators B and C would be constructed. Node 809 would return an empty list. Node 810 would return {811, 812}, from which consolidators D and E would be constructed. Aggregating these results yields the child list {B, C, D, and E}.

Figure 9:
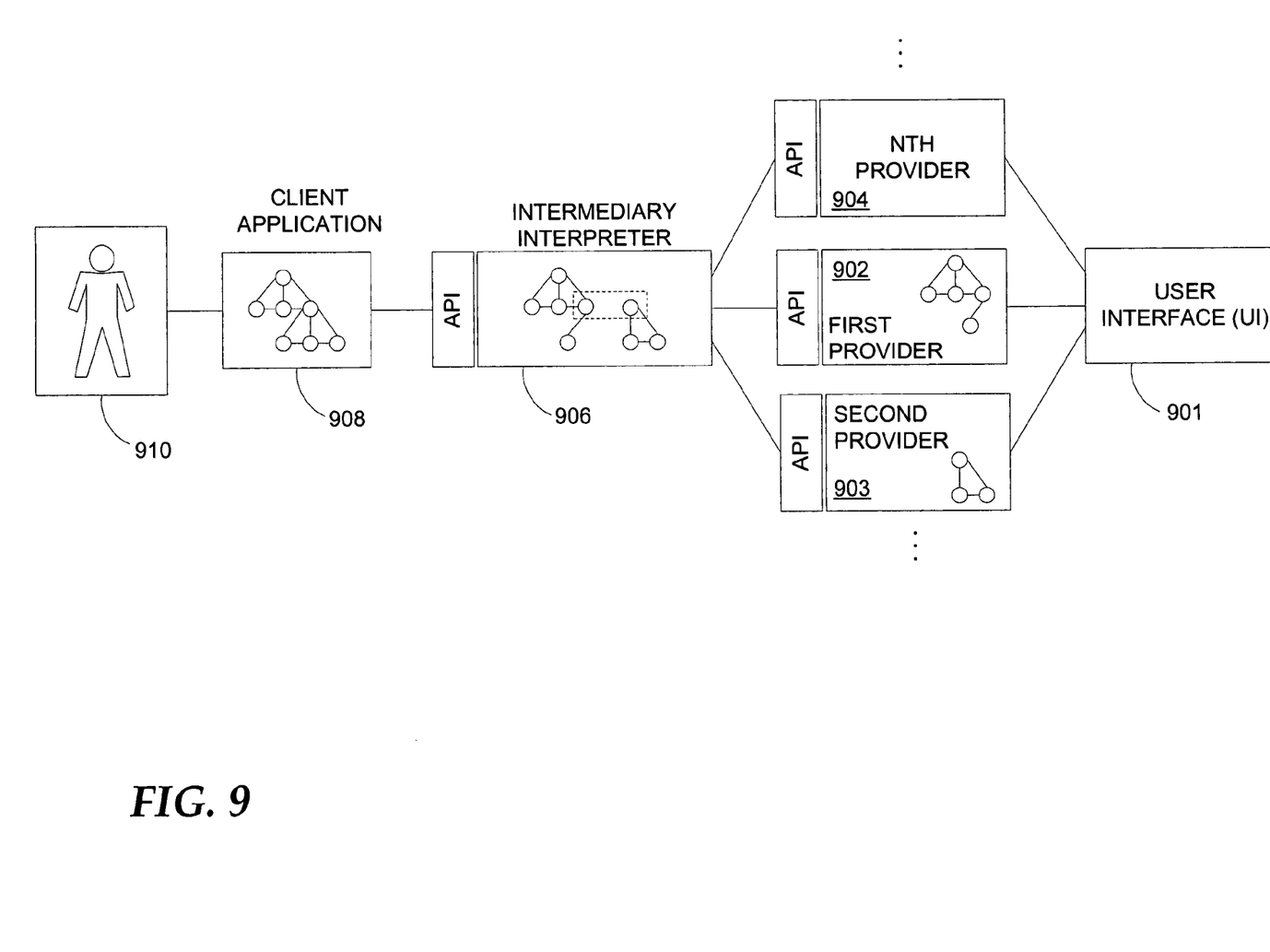
FIG. 9 is a data-flow diagram illustrating that two or more hierarchal structures appear as a single hierarchal structure to a client application.

Each of the aforementioned embodiments produces a substantially similar result, which is represented generally in FIG. 9. FIG. 9 depicts a user interface 901 in connection with a first provider 902, a second provider 903 and an $n^{th}$ provider 904. The $n^{th}$ provider 904 illustrates that any number of providers can be used in connection with the present invention. Providers 902, 903, and 904 have corresponding application program interfaces as shown. Each of the providers is coupled to an intermediary interpreter 906, which through its corresponding API communicates with client application 908. Client application 908 is used by a user 910. Consider an example where user 910 desires that certain components be enlarged or highly contrasted when selected. When user 910 engages a certain action that is supposed to trigger an element-presentation change, client application 908 will request information related to a user-interface element to be manipulated. Thus, intermediary interpreter 906 includes a set of instructions that provide the reception of a request for information related to explain one or more elements of user interface 908. Intermediary interpreter 906 also includes a second set of instructions that identifies the various hierarchal trees capable of satisfying a request from client application 222. In this example, intermediary interpreter will gather its data from first provider 902 and second provider 903. Using one or more of the technologies described above, intermediary interpreter 906 will utilize a set of instructions to represent the hierarchal structure from first provider 902 and the hierarchal structure of provider 903 to assimilate a representation that makes the respective trees appear to client application 908 as a single tree. Intermediary interpreter communicates the representation created to client application 908. Client application 908 is then provided with a representation that appears to be a single hierarchal structure, which can be used to manipulate the desired user-interface elements. Client application 908 is provided with a uniform tree of logical elements and is not aware that a first logical element is receiving properties from a first source and its children or siblings are receiving properties from other sources. This method greatly simplifies the means by which client application 908 needs to employ to manipulate desired user-interface elements.

As can be seen, the present invention and its equivalents are well-adapted to providing an improved method and system for representing multiple hierarchal structures as a single hierarchal structure. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Not all steps of the aforementioned flow diagrams are necessary steps.

The invention claimed is:

1. One or more computer-storage media having computer executable instructions embodied thereon for performing a method of conveying a representation of one or more programmatic hierarchal structures "hierarchal structures," the method comprising:

identifying a first dataset corresponding to a first hierarchal structure;

identifying a second dataset corresponding to a second hierarchal structure;

providing a first referential link between said first and second sets of data, wherein said first referential link indicates a target hosted node;

providing a second referential link between said first and second sets of data, wherein said second referential link indicates a source hosting node;

whereby said first hierarchal structure and said second hierarchal structure appear as a single hierarchal structure to a software application;

wherein said first and second datasets describe a collection of user-interface components; and wherein providing said first and second referential links includes creating a consolidating component that logically envelopes said first and second datasets such that said first and second datasets can be accessed as though the two datasets were combined into one dataset.

2. The media of claim 1, wherein said collection of user-interface components includes a collection composed of one or selections from the following:

a selectable user-interface element;

a user-interface element that can receive the focus;

a software application's user interface; and an operating system's user interface.

3. The media of claim 1, wherein said consolidating component, retrieves a first set of one or more properties associated with said first dataset;

retrieves a second set of one or more properties associated with said second dataset;

aggregates the first and second sets of one or more properties; and exposes the aggregated first and second sets of one or more properties incident to a request for either the first set of properties or the second set of properties.

4. The media of claim 1, wherein said consolidating component, retrieves a first set of one or more patterns associated with said first dataset;

retrieves a second set of one or more patterns associated with said second dataset;

aggregates the first and second sets of one or more patterns; and exposes the aggregated first and second sets of one or more patterns to a requesting application.

5. The media of claim 4, wherein said consolidating component,
retrieves a first set of one or more patterns associated with said first dataset;
retrieves a second set of one or more patterns associated with said second dataset;
aggregates the first and second sets of one or more patterns; and
exposes the aggregated first and second sets of one or more patterns incident to a request for either the first set of patterns or the second set of patterns.

6. The media of claim 4, wherein said consolidating component,
retrieves a first set of one or more hierarchal links associated with said first dataset;
retrieves a second set of one or more hierarchal links associated with said second dataset;
aggregates the first and second sets of one or more hierarchal links; and
exposes the aggregated first and second sets of one or more hierarchal links incident to a request for either the first set of patterns or the second set of patterns.

7. One or more computer-storage media having a data structure stored therein, the data structure comprising:
a first representation of a user-interface hierarchal structure;
a second representation of a second user-interface hierarchal structure;
a relational component that unites said first representation with said second representation, whereby said first representation and said second representation appear as a single hierarchal structure to a requesting component;
wherein said first and second representations include respective logical trees that describe one or more user-interface attributes;
wherein said one or more user-interface attributes include attributes of a user interface or one or more user-interface elements; and
wherein said relational component combines a set of patterns and properties respectively associated with said first representation and said second representation.

8. The media of claim 7, wherein said relational component combines a logical set of node links respectively associated with said first representation and said second representation.

9. A method for retrieving user interface information by utilizing the data structure of claim 7.

10. A method for running automatic software-testing scripts by utilizing the data structure of claim 7.

11. An application program interface (API) embodied on one or more computer-storage media that enables the manipulation of one or more elements to be depicted on a graphical user interface (GUI), the API comprising:
a first set of instructions that provides for the reception of a request for information related to displaying said one or more elements;
a second set of instructions that identifies one or more programmatic hierarchal structures "hierarchal structures" capable of satisfying said request;
a third set of instructions that represents said one or more hierarchal structures as a single hierarchal structure; and
a fourth set of instructions that communicates said representation of said single hierarchal structure incident to a receiving component.

12. The API of claim 11, wherein the information related to displaying said one or more elements includes attributes associated with a user interface.

13. The API of claim 12, wherein attributes associated with a user interface includes attributes associated with one or more user-interface elements.

14. The API of claim 13, wherein said one or more user-interface elements includes one or more selections from the following: a window, a dialog box, a button, a scroll bar, a toll bar, a listbox, a combo box, a radio button, a textual representation, an audio function, a hyperlink, or an arrangement of elements.

15. The API of claim 13, wherein said one or more hierarchal structures are logical representations of said one or more user-interface elements.

16. A method for manipulating a user interface or user-interface element comprising utilizing the API of claim 11.

17. One or more computer-storage media having computer-useable instructions embodied thereon for representing a plurality of programmatic hierarchal structures "hierarchal structures" as a single hierarchal structure, the method comprising:
receiving a request to provide information related to presenting one or more elements on a display device, wherein the response to the request is one or more hierarchal structure;
identifying one or more code portions to provide said information;
providing a destination to receive any return values associated with providing said information;
communicating said request and said destination to said identified one or more code portions for providing said information; and
providing said information such that at least a portion of said programmatic hierarchal structures are represented as a single hierarchal structure.

18. The media of claim 17, wherein said request to provide information includes a request for a description of one or more user-interface elements.

19. The media of claim 18, wherein the description of one or more user-interface elements includes pattern information, properties information, and/or relative-link information.

20. The media of claim 19, wherein pattern information includes data that describes functional aspects of a user-interface element.

21. The media of claim 20, wherein properties information include attributes related to a user-interface element.

22. The media of claim 21, wherein attributes related to a user-interface element comprise one or more of the following:
a position indication;
a name identifier;
a type indicator,
a read-only attribute;
a disablement property;
a size attribute;
an indication whether an element can receive the focus;
a window attribute; and
an audio attribute.

23. The media of claim 21, wherein the one or more code portions that can provide the information includes the code portion that received the request or a different code portion.

24. The media of claim 23, wherein said return values include one or more of properties, patterns, and/or relative links associated with said one or more elements.

* * * * *